(12) United States Patent
Jantunen et al.

(10) Patent No.: US 9,013,279 B2
(45) Date of Patent: Apr. 21, 2015

(54) DATA ACCESS DURING WIRELESS COMMUNICATION

(75) Inventors: Joni Jorma Marius Jantunen, Helsinki (FI); Jari-Jukka Harald Kaaja, Jarvenpaa (FI); Bertrand Gomez, Meylan (FR); Jaakko Valtteri Varteva, Veikkola (FI)

(73) Assignee: Nokia Corporation, Espoo (FI)

( * ) Notice: Subject to any disclaimer, the term of this patent is extended or adjusted under 35 U.S.C. 154(b) by 214 days.

(21) Appl. No.: 13/702,435

(22) PCT Filed: Jun. 8, 2010

(86) PCT No.: PCT/FI2010/050471
§ 371 (c)(1),
(2), (4) Date: Feb. 5, 2013

(87) PCT Pub. No.: WO2011/154587
PCT Pub. Date: Dec. 15, 2011

(65) Prior Publication Data
US 2013/0127602 A1    May 23, 2013

(51) Int. Cl.
*H04Q 5/22*    (2006.01)
*G06K 7/00*    (2006.01)
*H04W 52/02*    (2009.01)
*G06F 1/32*    (2006.01)

(52) U.S. Cl.
CPC ......... *G06K 7/0008* (2013.01); *H04W 52/0274* (2013.01); *G06F 1/3275* (2013.01); *G06F 1/3287* (2013.01); *G06K 2207/1012* (2013.01); *Y02B 60/1225* (2013.01)

(58) Field of Classification Search
CPC ............ H04W 52/0274; G06K 7/0008; G06K 2207/1012; G06K 19/0723; G06K 19/0701; G06F 1/3287; Y02B 60/1225
USPC ............ 340/10.51, 10.1, 10.34, 572.1, 10.33, 340/10.5; 235/435, 487
See application file for complete search history.

(56) References Cited

U.S. PATENT DOCUMENTS

| 7,231,530 | B1 | 6/2007 | Miller et al. |
| 7,542,437 | B1 | 6/2009 | Redi et al. |
| 7,806,332 | B2 * | 10/2010 | Satou ........................... 235/435 |

(Continued)

FOREIGN PATENT DOCUMENTS

| CN | 1922906 | 2/2007 |
| EP | 1450240 | 8/2004 |

(Continued)

OTHER PUBLICATIONS

Extended European Search Report of EP App. No. EP10852801—Date of Completion of Search: Feb. 11, 2014—7 pages.

(Continued)

*Primary Examiner* — Anh V La
(74) *Attorney, Agent, or Firm* — Locke Lord LLP

(57) ABSTRACT

An apparatus, a computer program product and a method is provided for data accessing during wireless communication. The example embodiment comprises receiving, through a transceiver at an apparatus, a first wireless signal comprising payload data and one or more indications instructing write operation for the payload data (520), and powering down the transceiver at least partly while storing the received payload data into an associated memory (530) within the apparatus according to the one or more indications.

20 Claims, 7 Drawing Sheets

(56) References Cited

U.S. PATENT DOCUMENTS

| | | |
|---|---|---|
| 7,825,776 B2 * | 11/2010 | Smith et al. ............... 340/10.51 |
| 2006/0175420 A1 | 8/2006 | Satou |
| 2008/0041930 A1 | 2/2008 | Smith et al. |
| 2009/0097428 A1 | 4/2009 | Kneckt et al. |
| 2009/0196209 A1 | 8/2009 | Haartsen |
| 2009/0237223 A1 * | 9/2009 | Zimmerman et al. ..... 340/10.51 |
| 2009/0245230 A1 | 10/2009 | Sampath et al. |

FOREIGN PATENT DOCUMENTS

| | | |
|---|---|---|
| WO | WO2005086512 | 9/2005 |
| WO | WO2007002712 | 1/2007 |
| WO | WO2009106672 | 9/2009 |

OTHER PUBLICATIONS

International Search Report for International Application No. PCT/FI2010/050471—Date of Completion of Search: Mar. 10, 2011, 6 pages.

English Language Machine Translation of Chinese Patent Application Publication No. CN1922906, 6 pages, Dec. 3, 2014.

* cited by examiner

DATA ACCESS DURING WIRELESS COMMUNICATION

TECHNICAL FIELD

The present application relates generally to wireless communication and data accessing during wireless communication.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing an electrical network as a power source. Due to rapid development of the wireless communication devices a number of areas capable of enabling entirely new types of communication applications have emerged. Not only has the processing power of electronic devices become faster and more power efficient than before, but also the memories and radio communication interfaces have developed with leaps such that new opportunities for useful implementations arise with an increasing pace.

Radio Frequency Identification (RFID) is an example of a technology that is experiencing a change of generation thanks to development in both communications and memory technologies. Originally, RFID technology was intended to provide an inexpensive, remotely readable tag that basically functions as a remotely readable bar code with a small memory to hold for example the identity of the tag. The tag comprised a small persistent memory with a unique identity (ID) corresponding to a code represented by the bar code system. For remote reading, a wireless transponder was provided to send the ID when receiving suitable radio transmission powering the transponder. Recently, faster radio powered communication technologies have been developed and the development of new memories enable storing of more than just some bytes of data in a memory associated with an RFID tag.

SUMMARY

Various aspects of examples of the invention are set out in the claims.

According to first aspect of the present invention, a method is provided comprising receiving, through a transceiver at an apparatus, a first wireless signal comprising payload data and one or more indications instructing write operation for the payload data, and powering down the transceiver at least partly while storing the received payload data into an associated memory within the apparatus according to the one or more indications.

According to second aspect of the present invention, a computer program product is disclosed, adapted to cause performance of the method according to the first aspect when said program is run on a computer.

According to third aspect of the present invention, an apparatus is disclosed, comprising means for receiving, through a transceiver at an apparatus, a first wireless signal comprising payload data and one or more indications instructing write operation for the payload data, and means for powering down the transceiver at least partly while storing the received payload data into an associated memory within the apparatus according to the one or more indications.

According to fourth aspect of the present invention, an apparatus is disclosed, comprising means for detecting a write-enabled device, means for selecting an operation mode configured to write data to the write-enabled device, and means for transmitting a first wireless signal comprising payload data and one or more indications configured to instruct write operation for the payload data according to the selected operation mode.

According to fifth aspect of the present invention, a method is provided comprising detecting a write-enabled device, the method further comprising selecting an operation mode configured to write data to the write-enabled device, and transmitting a first wireless signal comprising payload data and one or more indications configured to instruct write operation for the payload data according to the selected operation mode.

According to sixth aspect of the present invention, a computer program product is disclosed, adapted to cause performation of the method according to the fifth aspect when said program is run on a computer.

According to seventh aspect of the present invention, an apparatus is disclosed, comprising means for detecting a write-enabled device, means for selecting an operation mode configured to write data to the write-enabled device, and means for transmitting a first wireless signal comprising payload data and one or more indications configured to instruct write operation for the payload data according to the selected operation mode.

According to eighth aspect of the present invention, an apparatus is disclosed, comprising a transceiver, at least one processor and at least one memory including executable instructions, the at least one memory and the executable instructions being configured to, in cooperation with the at least one processor, cause the apparatus to perform at least the following: Detect a write-enabled device; select an operation mode configured to write data to the write-enabled device; and transmit a first wireless signal comprising payload data and one or more indications configured to instruct write operation for the payload data according to the selected operation mode.

According to ninth aspect of the present invention, a method is disclosed, comprising receiving, through a transceiver at an apparatus, a wireless signal requesting data from an associated memory, and powering down the transceiver at least partly while reading out requested data from the associated memory.

According to tenth aspect of the present invention, a computer program product is disclosed, adapted to cause performation of the method according to the ninth aspect when said program is run on a computer.

According to eleventh aspect of the present invention, an apparatus is disclosed comprising means for receiving, through a transceiver at an apparatus, a wireless signal requesting data from an associated memory, and means for powering down the transceiver at least partly while reading out requested data from the associated memory.

According to twelfth aspect of the present invention, an apparatus is disclosed comprising a transceiver, at least one processor, and at least one memory including executable instructions, the at least one memory and the executable instructions being configured to, in cooperation with the at least one processor, cause the apparatus to perform at least the following: Receive, through the transceiver, a wireless signal requesting data from the at least one memory; and power down the transceiver at least partly while reading out requested data from the at least one memory.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential effects are understood by referring to FIGS. 1 through 8 of the drawings.

Figure 1:
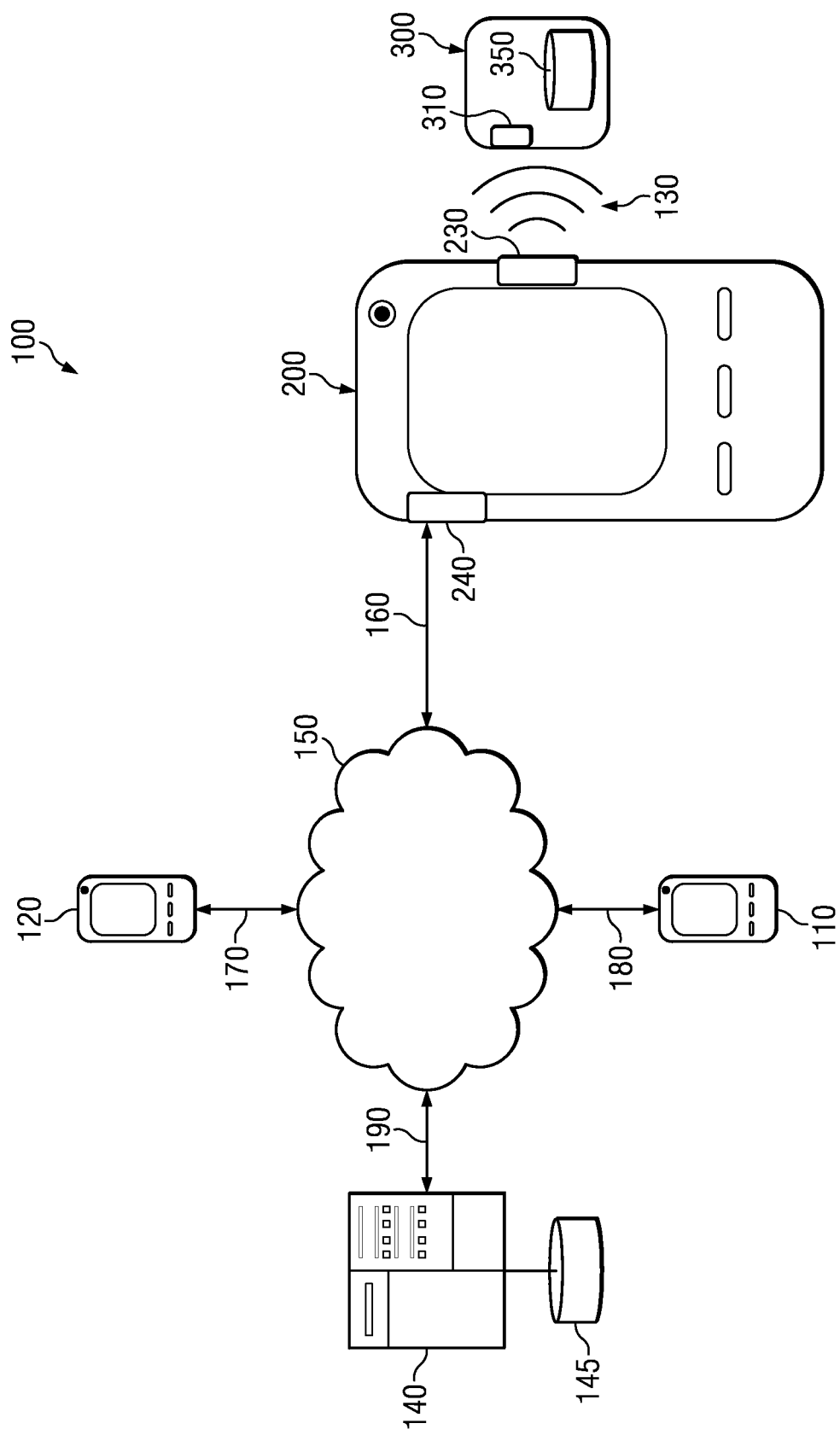
FIG. 1 discloses an example of operational environment in which apparatuses according to an example embodiment of the invention may be used.

FIG. 1 discloses an example of operational environment 100 in which various apparatuses according to an example embodiment of the invention may be used. An apparatus 200, for example a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, or the like is shown having communication means, such as a short-range communications interface 230 configured to communicate wirelessly with another short-range communication device, such as device 300, by transmitting wireless short-range communication signals 130.

Short-range communication signals 130 may be used for the exchange of information over a local area varying for example from a couple of centimeters to some hundred of meters. Examples of wireless short-range communication technologies comprise near field communication technologies based on Radio-Frequency Identification (RFID), such as MIFARE, Felicity Card (FeliCa) and Near Field Communication (NFC) technologies, Bluetooth™, Bluetooth™ Low Energy, WLAN, Wireless Universal Serial Bus (WUSB), Ultra-Wideband (UWB) and ZigBee (802.15.4, 802.15.4a) technologies.

Apparatus 200 may further be embodied as a portable wireless communications device equipped with wide-area communication means, such as long-range communications interface 240 to connect with network 150 via a wireless communication link 160. Examples of wireless wide-area communication technologies comprise 2nd generation (2G) digital cellular networks, for example Global System for Mobile Communications (GSM) that may communicate in the 900 MHz/1.8 GHz bands in Europe and in the 850 MHz and 1.9 GHz bands in the United States. Wide-area communication technologies may further comprise general packet radio service (GPRS) technology, universal mobile telecommunications system (UMTS) technology, code division multiple access (CDMA) technologies, and/or the like.

According to an alternative example embodiment, link 160 may be provided with a wired connection. Examples of wired communication technologies include ethernet, IEEE 1394, universal serial bus (USB) protocol, any other serial or parallel wired connection, and/or the like. Network 150 may be either a wireless network, or a wired network. Network 150 may further be connected to other networks. According to a further example embodiment, apparatus 200 may be a stationary device having a wireless and/or a wired interface for communicating with network 150.

Device 300, as shown in the example of FIG. 1, may be equipped with a short-range communication interface 310 that is responsive to short range communication signals 130 created by apparatus 200. According to one example embodiment, the short-range communication interface 310 has means for receiving and extracting power from the received signal 130 by using for example a radio-frequency power extractor module. The extracted power may provide at least a portion of the power required for the device 300 to be operational and communicate with apparatus 200. Example device 300 of FIG. 1 further comprises a memory/storage 350 that may be configured to store information received from the apparatus 200 via the short-range communication signal 130.

As further shown in FIG. 1 various other devices, such mobile devices 110 and 120, and server 140 including a database 145 may be connected to the network 150 via respective links (170, 180 and 190) so that apparatus 200 may communicate with any of the other devices via the network 150.

Figure 2:
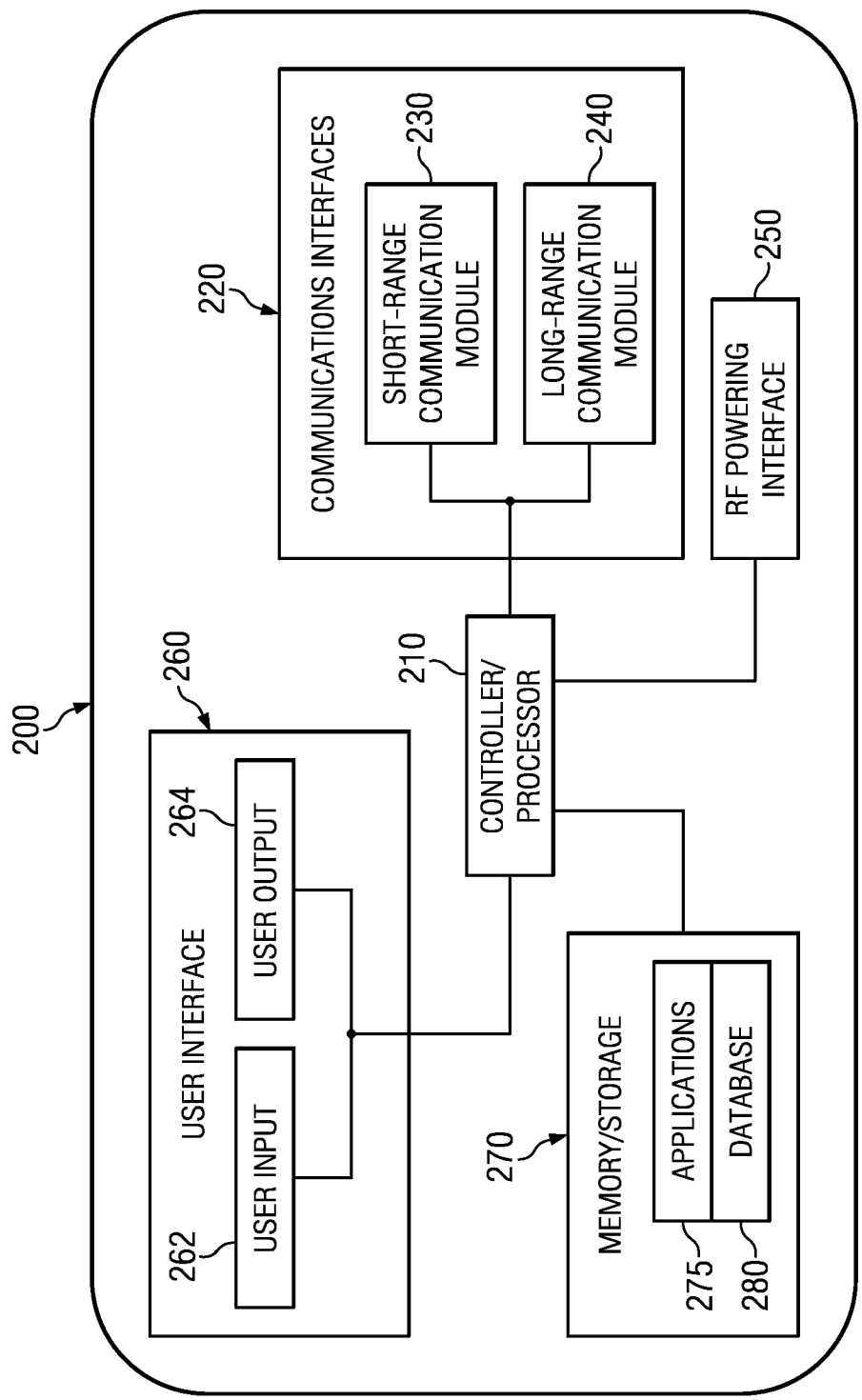
FIG. 2 discloses a modular layout for an example apparatus according to an example embodiment of the present invention.

FIG. 2 discloses a modular layout for an apparatus according to an example embodiment of the present invention. Apparatus 200 is broken down into modules representing a number of functional aspects of the device. These functions may be performed by various combinations of the software and/or hardware components discussed below.

Control module 210 regulates operation of the apparatus 200. The control module may be embodied as a controlling means, for example as a controlling circuitry or a processor. Inputs may be received from various other modules comprised within apparatus 200. For example, user interface 260 may provide input to the control module 210 in response to receiving input from a user via user input 262. So, user input received via the user interface 260 may be used as an input in the control module 210 for controlling the operation of the apparatus 200. Control module 210 may interpret the data input and, in response, may issue one or more control commands to at least one of the other modules in apparatus 200.

In an example embodiment, apparatus 200 comprises a communications interface 220. Communications interfaces 220 may incorporate one or more communication modules of the apparatus 200. In an example embodiment, the communications interfaces 220 may comprise a means for wired and/or wireless communication. As shown in the example of FIG. 2, communications interfaces 220 may comprise a short-range communications module 230 and a long-range communications module 240. The apparatus 200 may comprise further communications modules, for example further wired and/or wireless communication modules. Communications interfaces 220 may utilize one or more of these modules to receive communication from both local and long distance sources, and to transmit data to recipient devices from the apparatus 200. Communications interfaces 220 may be activated by control module 210, or by control resources local to the sub-modules responding to received messages, environmental influences and/or other devices in communication with the apparatus 200.

Short-range communication module 230 may comprise a near field communications interface configured to communicate over a short distance, for example over a range of a few centimeters using electromagnetic and/or electrostatic coupling technologies. In an example embodiment, near field communication comprises radio-frequency identification (RFID) technologies including Near Field Communication (NFC) technology.

Radio-Frequency Identification (RFID) technologies provide wireless systems for automatic identification, tracking and managing of objects via a wireless connection between a tag attached to the object and a reader device. The tag may include a transponder that may be active or passive. In the presence of an electromagnetic field created by the reader device, the transponder may transmit at least an object identity signal. The reader device may sense and decode the broadcast signal to identify the object. The object identity is received by the reader device via a connectionless communication. In other words, the object identity signal is received without a logical connection between the reader device and the tag attached to the object. RFID technologies comprise a range of RF transmission systems, for example standardized and proprietary systems for a large number of different purposes, such as product tagging for inventory handling and logistics, theft prevention purposes at the point of sales and product recycling at the end of the life-cycle of the tagged product. In addition, RFID systems have been introduced for various payment and ticketing concepts comprising public transportation ticketing and payment. As an example, in several European countries and also in Canada and Mexico, there are several public transportation systems based on Calypso, the international electronic ticketing standard for microprocessor contactless smartcards, originally designed by a group of European transit operators. Further, for example in Japan, Hong Kong and Korea, there are Felicity Card (FeliCa) technology based mass transit systems, such as the Octopus card system in Hong Kong. The Octopus card is a rechargeable contactless stored value smart card used to transfer electronic payments in online or offline systems in Hong Kong. In addition, RFID based tagging is a common technology for animal identification and similar concepts have been proposed to for human implantation also.

Near Field Communication (NFC) is a RFID based technology that evolved from a combination of existing contactless identification and interconnection technologies operating at 13.56 MHz. NFC is a technology providing also bi-rectional directional communication between NFC devices. Communication between two NFC-compatible devices occurs when they are brought close to one another. NFC technology was introduced by a non-profit industry association named NFC Forum to advance the use of NFC short-range wireless interaction in consumer electronics, such as, for example, mobile devices and personal computers.

Short-range communication module 230 may comprise in addition, or alternatively, also other short-range communication interfaces for exchanging information across short-range wireless network using a short-range communication protocol. Example communication protocols for short-range communication may comprise Bluetooth™, Bluetooth™ Low Energy, wireless local area network (WLAN), ultra-wide band (UWB), and wireless universal serial bus (WUSB) technologies.

As an example, Bluetooth™ Low Energy is an extension for Bluetooth™ that is designed for low energy consumption. Bluetooth™ Low Energy may offer long-lasting connectivity with low power consumption. Thus, Bluetooth™ Low Energy may extend the range of potential applications for Bluetooth™ communication. Bluetooth™ Low Energy is designed to bridge the gap between small sensor type devices and mobile devices as it consumes only a fraction of the power of a classic Bluetooth™ device. With Bluetooth™ Low Energy, a device may operate more than a year on a button cell battery without recharging.

Long-range communication module 240 may comprise one or more long-range communications interfaces configured to communicate and exchange information over a long distance in a large geographic area using any of the wide-area communication technologies described earlier in connection with FIG. 1.

As a subset of long-range communications module 240, or alternatively operating as an independent module separately coupled to processor 210, the apparatus 200 may comprise a broadcast receiver. The broadcast receiver may be a digital audio- or video receiver, for example a digital audio broadcasting (DAB) or a digital video broadcasting (DVB) receiver, and/or the like. According to an example embodiment, the broadcast receiver comprises a Digital Video Broadcast for Handheld Apparatuses (DVB-H) receiver. The broadcasting transmissions may be encoded so that only certain apparatuses may access the transmitted content. The broadcast transmission may comprise text, audio and/or video information, and data. In an example embodiment, apparatus 200 may receive broadcasts and/or information within the broadcast signal to determine if the apparatus is permitted to view the received content.

According to an example embodiment, either the short-range communications module 230, or the long-range communications module 240 may be equipped with a wired interface that may be used for communicating with another device using a wired communication protocol via an interface such as ethernet, an IEEE 1394 communication interface, a universal serial bus (USB) interface, and/or the like.

User interface 260 may include visual, audible and/or tactile elements which allow a user to receive data from, and enter data into, the apparatus. Data entered by a user is received via user input module 262 and may be interpreted by control module 210, for example to affect the behavior of apparatus 200. User-inputted data may also be transmitted via the communications interface 220 to another device. Information may also be received by other devices at the apparatus 200 via communications interface 220. Control module 210 may cause this information to be transferred to user interface 260 for presentation to the user via user output module 264. User interface 220 may comprise one or more user input and output modules, and there may also be a module operating both as a user input module 262 and user output module 264, for example a touch screen display operating as a tactile user interface.

According to one embodiment, apparatus 200 may further comprise an RF powering interface 250. RF powering interface 250 may be configured to provide a wireless signal for enabling another device, such as the short-range communications device 300 of FIG. 1 to receive at least a portion of necessary power for operation. RF powering interface 250 may be further configured to provide an RF field for enabling the other device, such as the short-range communications device 300, to receive necessary power for responding to signals transmitted by the apparatus via the short-range communication module 230. According to one embodiment, the RF powering signal may include timing information so that a receiving device, such as the short-range communications device 300 of FIG. 1, can maintain synchrony with apparatus 200 during communication. An example of such RF powering interface 250 is an ultra-high frequency (UHF) power transceiver that has the sole purpose of creating a powering signal when apparatus 200 is communicating with passive tag device requiring such external powering. This type of powering interface may be advantageous especially in situations where the apparatus 200 is communicating with passive radio frequency tags operating over a high data rate communication channel, such as an impulse radio based ultra wide-band short-range communication protocol that is not capable of providing the necessary power to the passive and/or semi-passive tag device with the transmitted communication signals. Alternatively, the RF powering interface 250 may be implemented within one or more of the communication modules. As an example, the RF powering interface 250 may be included within the long-range communication module 240 implemented for example as an add-on part of the Global System for Mobile Communications (GSM) radio module that is used to alter the communication modules behavior to provide the necessary RF powering signal when such powering is needed. Similarly, the RF powering interface 250 may be included within the short-range communication module 230 implemented for example as an add-on part of the RFID communications module to alter behavior of the short-range communication module 230 to provide the necessary RF powering signal when such powering is needed.

Apparatus 200 may further comprise a memory or storage 270. Memory/storage 270 may be connected to controller 210. Memory/storage 270 may include an application module 275 which incorporates other hardware and/or software applications of apparatus 200. The memory/storage 270 may also incorporate a database 280. The database 280 may comprise one or more data items, for example information related to one or more users of the apparatus 200. Memory/storage 270 may further store executable instructions that are configured to cause the apparatus 200 to perform various actions in co-operation with the control module 210.

Figure 3A:
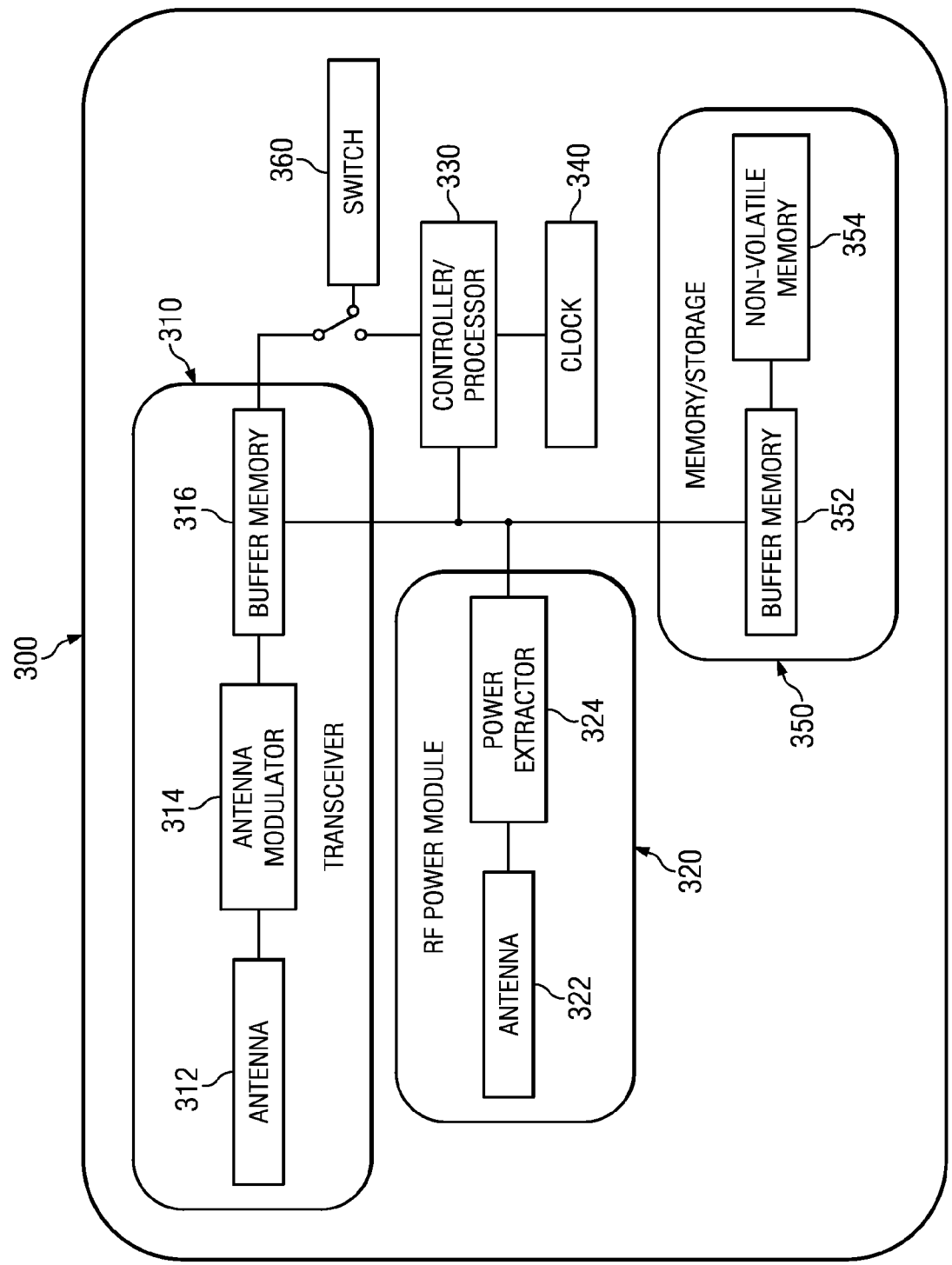
FIG. 3A discloses a modular layout for another example apparatus according to an example embodiment of the present invention.

FIG. 3A discloses an example modular layout for an example apparatus, such as device 300 of FIG. 1, according to an example embodiment of the present invention. This example implementation of device 300 comprises RF interface embodied as a transceiver 310 comprising antenna 312, antenna modulator 314 and buffer memory 316 that is configured to record for example information received via the RF interface before forwarding the information to other modules within the apparatus. Antenna modulator 314 controls one or more properties of antenna 312, such as its impedance. This enables the example device 300, such as a passive radio frequency tag to reflect and/or absorb reader-initiated transmissions. According to one embodiment, the reader-initiated transmissions comprise impulse radio based ultra wide-band signals that convey information. Upon receipt of the transmissions, the example device 300 may generate reflections that may be used to convey information to communicate back to the reader according to used communication protocol. Antenna modulator 314 may cause such reflections to occur in response to particular portions of received signals, such as clock pulses.

According to one embodiment, device 300 includes means for switching operating power for the transceiver 310 implemented as a switch 360. It should be noted that although a physical switch 360 is shown on the example embodiment of FIG. 3A, the switch may be implemented also as software or any combination of software and/or hardware. Irrespective of the implementation of the switch, the purpose of the switch is to control operation of the RF interface so that the transceiver 310 can be powered down at least partly. In other words, switch 360 is capable of powering down any one of the modules within transceiver 310, or the entire transceiver upon receiving corresponding instruction.

The example device 300 of FIG. 3A further includes a processing module 330 controlling various operations within the apparatus 300, such as controlling the operation of the switch 360, a clock extraction module 340, a memory/storage 350 and a RF power module 320. Processing module 330 controls device operation. As shown in example FIG. 3A, processing module 330 may be coupled to an associated memory, such as memory/storage 350. Processing module 330 may be embodied as controlling means, such as a controlling circuitry or one or more microprocessors that are each capable of executing software instructions stored in the memory/storage 350.

According to one embodiment, clock extraction module 340 is configured to govern performance of other device components. For instance, the clock extraction module 340 may control the timing in which antenna modulator 320 varies the impedance of antenna 315. According to an embodiment the clock extraction module 330 is configured to provide time stamps, e.g. to any received or transmitted packets or signals.

According to one embodiment of the present invention, RF power module 320 is configured to provide power to various components of device 300. Power module 320 may include antenna 322 and power extractor 324 modules including suitable electronics (such as coil(s), rectifier(s), and/or capacitor(s)) to harvest energy from received electromagnetic transmissions, such as from an interrogation signal composed of a series of signals. In addition to conveying information, each of these signals may transfer energy that keeps voltage of the device 300 above the device's minimum required operational voltage. Therefore, device 300 may continually operate without any internal power source until the voltage decays below the minimum required operational voltage. According to an alternative embodiment, the RF power module 320 may receive power from transmissions originated by another transmission source. So, instead of receiving operational power from received signals including payload data, device 300 may receive power from an RF powering signal provided for example by RF powering interface 250 of apparatus 200. According to one embodiment, the RF powering signal includes also timing information so that device 300 can maintain synchrony with signal source, such as apparatus 200 of FIG. 1, during communication. Device 300 equipped with RF power module 320 may operate as a passive or semi-passive tag that utilizes energy received from the received electromagnetic transmissions at least for communicating information back to source of the transmission.

Memory/storage 350 stores information in the form of data and software components (also referred to herein as modules). These software components include instructions that can be executed by processing module 330. Various types of software components may be stored in memory/storage 350. For instance, memory/storage 350 may store software components that control the generation of data. Memory/storage 350 may be implemented with random access memory (RAM), read only memory (ROM), Flash memory and/or phase change memory (PCM), or like.

According to an example embodiment of FIG. 3A, the memory/storage 350 includes an internal buffer memory 352 and at least one non-volatile memory module 354, embodied for example either as a Flash, or phase change memory (PCM) memory module. The buffer memory 352 operates as a temporary storage location for payload data to be recorded into the non-volatile memory module 354 upon actual recording operation. Writing data to a non-volatile memory requires considerable amount of energy. For example, a Read Only Memory chip (ROM), such as Electrically Erasable Programmable Read-Only Memory (EEPROM), or serial Flash memory chip having memory size in the order of few megabits and supply voltage at 1.8 volts, the power consumption for actual write operation ranges roughly from 2 to 20 mW. Emerging memory technologies, such as the phase change memory (PCM), may reduce the power consumption of the write operation, but on the other hand the memory sizes are constantly increasing, so the problem remains.

According to one embodiment, device 300 may further include an internal power source, such as a battery so that the device 300 can remain operational (i.e. perform various internal processes such as storing data etc.) without external powering. However, even with internal power source device 300 may still require the external RF field for communication with external devices.

In view of the above, when considering passive devices, such as write-enabled radio frequency tags having no internal power source, power consumption of various operations becomes important. One technical challenge in developing a passive device with no internal power source is that writing data to a non-volatile memory may consume a significant amount of the whole available power budget. Further, when communicating with passive devices, a reader/writer device, such as apparatus 200, have to provide necessary power for the passive device, such as the write-enabled radio frequency tag device 300 to operate and communicate with the reader/writer device 200. So, the power consumption of the passive device may result as increased power consumption of the reader/writer device. In a battery powered device, such as apparatus 200, energy consumption is an important topic to consider in connection with operating times, which depends on the current required for operating the device and available battery capacity. So, the higher the energy consumption of apparatus 200 is, the smaller the battery lifetime is for the same device.

According to one example embodiment of the present invention, when payload data is stored to a non-volatile memory associated with a passive device, such as recording data from buffer memory 352 to non-volatile memory module 354 of example apparatus 300, at least a portion of the transceiver 310 is powered down for example by way of using the switch 360 to disconnect one or more modules in the transceiver 310 from power source. According to an alternative example embodiment, controller 330 may be programmed to power down at least a portion of the transceiver 310 or the entire transceiver when payload data is stored to non-volatile memory 354. When the entire transceiver is powered down, device 300 may remain synchrony with signal source by way of using timing information included in the RF powering signal that is received via the RF power module.

Figure 3B:
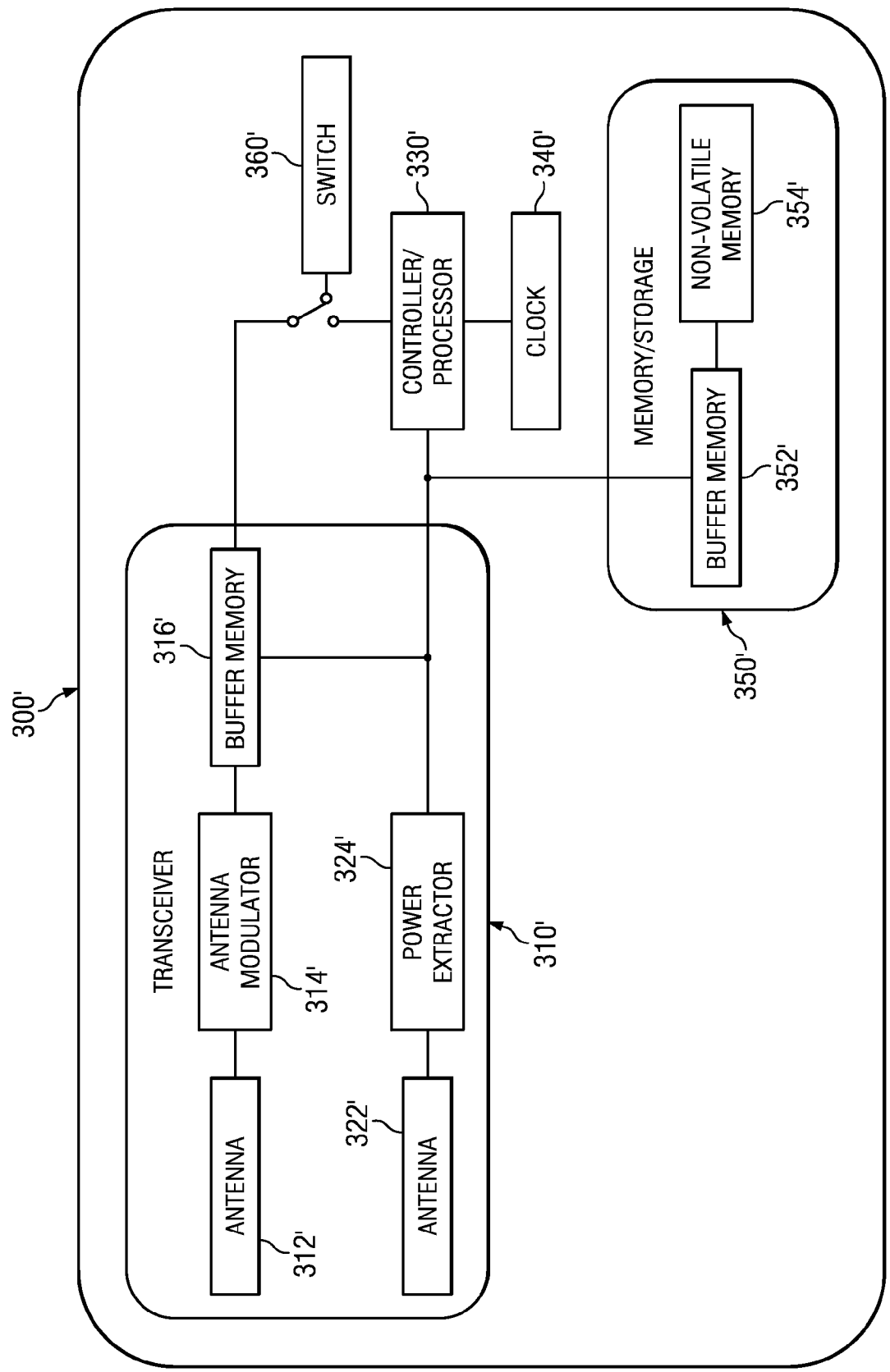
FIG. 3B discloses a modular layout for the other example apparatus according to another example embodiment of the present invention.

FIG. 3B discloses an example modular layout for an example apparatus according to another example embodiment of the present invention. Device 300' according to this alternative example embodiment includes basically the same functional modules than example device 300 of FIG. 3A with similar functions except that RF powering module is integrated into transceiver 310'. So, example transceiver 310' includes in addition to antenna 312', antenna modulator 314' and a buffer memory 316' also a separate antenna 322' and a power extractor 324' including suitable electronics (such as coil(s), rectifier(s), and/or capacitor(s)) to harvest energy from received electromagnetic transmissions, such as from an interrogation signal composed of a series of signals. In addition to conveying information, each of these signals may transfer energy that keeps voltage of the device 300' above the device's minimum required operational voltage. Therefore, also device 300' may continually operate without any internal power source until the voltage decays below the minimum required operational voltage using necessary power harvesting modules integrated into RF interface as shown in the example device 300' of FIG. 3B. According to an alternative embodiment, the integrated power harvesting modules may receive power from transmissions originated by another transmission source via the RF interface. So, instead of receiving operational power through from received signal including payload data, device 300' may receive power from an RF powering signal provided for example by RF powering interface 250 of apparatus 200. Device 300' equipped with integrated power harvesting modules in RF interface as shown in the transceiver 310' of FIG. 3 may operate as a passive or semi-passive tag that utilizes energy received from the received electromagnetic transmissions at least for communicating information back to source of the transmission.

Similarly to device 300 of FIG. 3A, device 300' of FIG. 3B may include a processing module 330' controlling various operations within the apparatus 300', such as controlling operation of switch 360' for powering down the transceiver 310' at least partly. According to one embodiment, switch 360' is capable of powering down any one of the modules within transceiver 310' except modules related to harvesting power from received electromagnetic transmissions, Further, example device 300' includes a clock extraction module 340' and a memory/storage 350' configured to operate in a similar fashion as the example clock extraction module 340 and the memory and/or storage 350 of device 300 of FIG. 3A.

According to one embodiment, device 300' may also include an internal power source, such as a battery so that the device 300' can remain operational (i.e. perform various internal processes such as storing data etc.) without external powering. However, even with internal power source device 300' may still require the external RF field for communication with external devices.

According to one example embodiment of the present invention, when payload data is stored to a non-volatile memory associated with a passive device, such as recording data from buffer memory 352' to non-volatile memory module 354' of example apparatus 300', at least a portion of the transceiver 310' is powered down for example by way of using the switch 360' to disconnect one or more modules in the transceiver 310' from power source. According to an alternative example embodiment, controller 330' may be programmed to power down at least a portion of the transceiver 310' or the entire transceiver when payload data is stored to non-volatile memory 354'.

Figure 4:
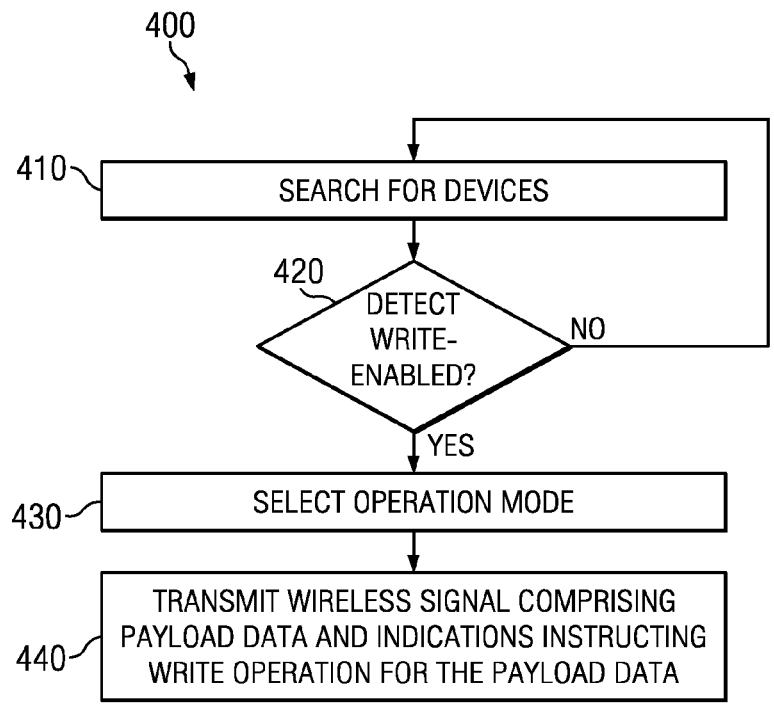
FIG. 4 illustrates a flow diagram showing example operations for transmitting data to another device for information storing according to an example embodiment of the present invention.

FIG. 4 illustrates an example method 400 for transmitting data to another device for information storing according to an example embodiment of the present invention. The method starts with block 410 where an apparatus, such as device 200 of FIG. 1 with a need to write or store specific data to another device transmits one or more wireless signals in order to search for radio frequency devices, such as write-enabled device 300 of FIG. 1. The wireless signals comprise, according to an embodiment of the present invention, an RF interrogation signal that may provide necessary energy for the other device to respond to the interrogation signal. According to one embodiment, the interrogation signal energizes the other device.

In response to the transmitted signals, the apparatus may receive one or more wireless signals that can be used for detecting external devices, as shown in block 420. In case no write-enabled devices are detected, the method goes directly back to block 410 and continues with searching for radio frequency devices. According to one embodiment, the operation may be periodical so that a predetermined delay is implemented before entering back to block 410. In case at least one detected device comprises a write-enabled device, the method continues with block 430 where operation mode to write data to a memory associated with a write-enabled tag device is selected. According to one embodiment, the operation mode comprises a protocol for writing data to the write-enabled device.

After selection of the operation mode to write data to the memory associated with the write-enabled device in block 430, the method continues with block 440 where the write operation is performed according to the selected operation mode. According to an embodiment, the write operation mode comprises communicating with the write-enabled device according to the protocol for writing data to the write-enabled device, wherein the protocol may comprise exchange of one or more signals including payload data and one or more indications instructing write operation for the associated payload data. According to one embodiment, the one or more indications further comprise timing information including a time period and instructions for a receiving write-enabled device to power down associated transceiver at least partly for the duration of the time.

According to one embodiment, apparatus 200 may transmit instead of the interrogation signal another type of wireless signal comprising power for powering the write-enabled device at least partly. This other wireless signal may be dedicated for powering the write-enabled device and used in parallel with the signals communicating payload data. According to one embodiment, the other wireless signal may further comprise timing information for maintain synchrony for communication with the write-enabled device also during situations when transceiver of the write-enabled device is at least partly powered down and cannot be used for maintaining synchrony. According to one embodiment, the powering level of the transmitted powering signal is set to a higher level during times when the write-enabled device is instructed to power down the transceiver to make sure that the write-enabled device has necessary power resource to perform the power consuming write operation.

Figure 5:
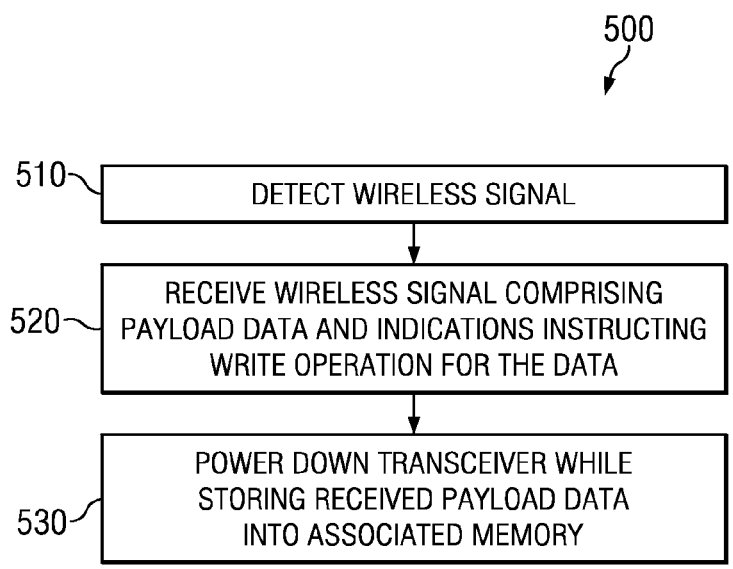
FIG. 5 illustrates a flow diagram showing example operations for information storing according to an example embodiment of the present invention.

FIG. 5 illustrates an example method 500 showing example operations for information storing according to an example embodiment of the present invention. The method may start with an optional block 510 where an apparatus, such as the write-enabled device 300 of FIG. 1, detects a wireless signal providing power to the device. After receiving the wireless signal of block 510, the method 500 continues with block 520 where the write-enabled device receives one or more wireless signals including payload data and one or more indications instructing write operation for the payload data into a memory associated with the write-enabled device according to a protocol configured for writing data into the write-enabled device.

Method 500 then continues with step 530 where the apparatus, such as the write-enabled device 300 of FIG. 1, powers down associated transceiver at least partly while storing payload data into an associated memory. According to one embodiment, powering down of the associated transceiver may be triggered in response to detecting that an associated buffer memory is full, or about to get full. According to one embodiment, the one or more indications further comprise timing information including a time period and instructions for the apparatus to power down the associated transceiver at least partly for the duration of the time period. According to an alternative embodiment, the associated transceiver is powered down at least partly until storing of the received payload data into the associated memory is completed. According to one embodiment, powering down of the associated transceiver may happen in more than one stage. For example, after receipt of the entire payload data RF receiving parts of the transceiver can be powered down in first stage. Similarly, after transceiver's buffer memory is emptied to other parts of the apparatus it can be powered down as a second stage.

Although the above discussion of various embodiments of the present invention has been relating to storing data into an associated memory, corresponding techniques are applicable also whenever an operation requiring memory access is performed, such as providing data from the associated memory to another apparatus according to one embodiment of the present invention. So, when an apparatus, such as device 300 of FIG. 1, receives wireless signals requesting data from an associated memory, such as non-volatile memory 354 of FIG. 3, the apparatus may power down an associated transceiver at least partly while requested data is read out from the non-volatile memory 354. Then, when the requested data is ready to be provided to the requesting device via the RF interface, the transceiver may be powered up back again for transmitting said data to the requesting device. Further, similarly to various embodiments of the present invention relating to storing data to an associated memory, also in connection with embodiments relating to providing data from the associated memory to a requesting device, the devices may negotiate timing of powering down or the device providing the data may independently decide on the timing of the powering down.

Figure 6:
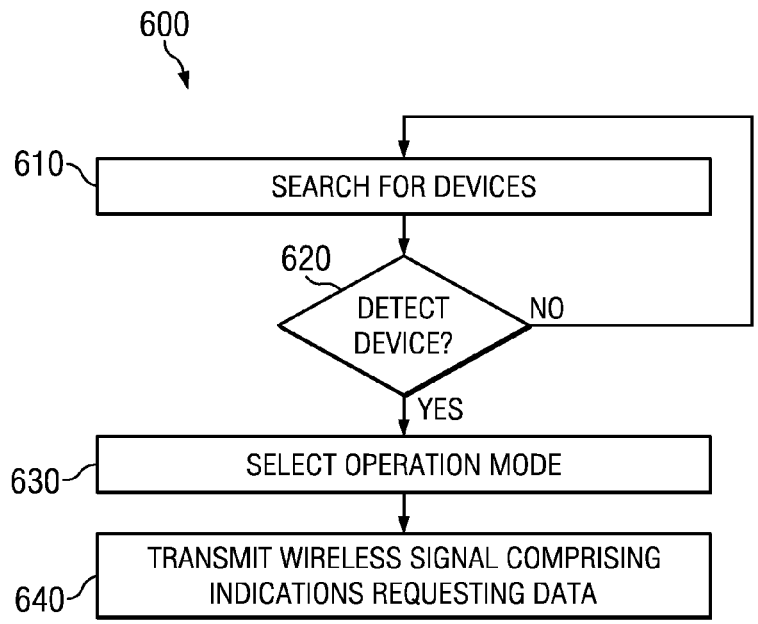
FIG. 6 illustrates a flow diagram showing example operations for receiving data from another device according to an example embodiment of the present invention.

FIG. 6 illustrates an example method 600 for receiving data from another device according to an example embodiment of the present invention. The method starts with block 610 where an apparatus, such as device 200 of FIG. 1 with a need to receive data from another device transmits one or more wireless signals in order to search for radio frequency devices, such as device 300 of FIG. 1. The wireless signals comprise, according to an embodiment of the present invention, an RF interrogation signal that may provide necessary energy for the other device to respond to the interrogation signal. According to one embodiment, the interrogation signal energizes the other device.

In response to the transmitted signals, the apparatus may receive one or more wireless signals that can be used for detecting external devices, as shown in block 620. In case no devices are detected, the method goes directly back to block 610 and continues with searching for radio frequency devices. According to one embodiment, the operation may be periodical so that a predetermined delay is implemented before entering back to block 610. In case at least one device is detected, the method continues with block 630 where operation mode to receive data from a memory associated with the detected device is selected. According to one embodiment, the operation mode comprises a protocol for reading data from the detected device.

After selection of the operation mode to read data from the memory associated with the detected device in block 630, the method continues with block 640 where the read operation is performed according to the selected operation mode. According to an embodiment, the read operation mode comprises communicating with the detected device according to the protocol for reading data from the detected device, wherein the protocol may comprise exchange of one or more signals including one or more indications instructing read operation from the associated memory of the detected device. According to one embodiment, the one or more indications further comprise timing information including a time period and instructions for a receiving device to power down associated transceiver at least partly for the duration of the time period.

According to one embodiment, apparatus 200 may transmit instead of the interrogation signal another type of wireless signal comprising power for powering the detected device at least partly. This other wireless signal may be dedicated for powering the detected device and used in parallel with the signals communicating payload data. According to one embodiment, the other wireless signal may further comprise timing information for maintain synchrony for communication with the detected device also during situations when transceiver of the detected device is at least partly powered down and cannot be used for maintaining synchrony.

Figure 7:
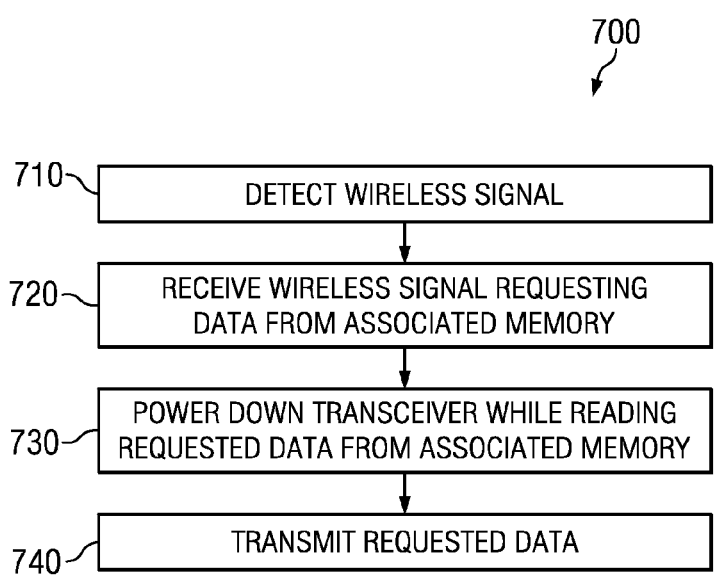
FIG. 7 illustrates a flow diagram showing example operations for providing information to another device according to an example embodiment of the present invention.

FIG. 7 illustrates an example method 700 showing example operations for providing information to another device according to an example embodiment of the present invention. The method may start with an optional block 710 where an apparatus, such as device 300 of FIG. 1, detects a wireless signal providing power to the device. After receiving the wireless signal of block 710, the method 700 continues with block 720 where the device receives one or more wireless signals requesting data from a memory associated with the device according to a protocol configured for reading data from device.

Method 700 then continues with block 730 where the apparatus, such as device 300 of FIG. 1, powers down associated transceiver at least partly while reading out data from an associated memory. According to one embodiment, the received wireless signal comprises one or more indications including a time period and instructions for the apparatus to power down the associated transceiver at least partly for the duration of the time period. According to an alternative embodiment, the associated transceiver is powered down at least partly until reading out of the requested data from the associated memory is completed.

Method 700 then continues with block 740, where the apparatus, such as device 300 of FIG. 1 transmits the requested data to requesting apparatus, such as device 200 of FIG. 1. In case the requested data is not available in the associated memory, method 700 may be stopped before proceeding to blocks 730-740. Before transmitting the requested data to requesting apparatus, the associated transceiver, such as transceiver 300 of FIG. 1, is powered. Powering of the transceiver may be triggered e.g. in response to detecting that the buffer memory is full, or when reading of the requested data from the non-volatile memory is completed.

Without in any way limiting the scope, interpretation, or application of the claims appearing below, a technical effect of one or more of the example embodiments disclosed herein may be power saving in an apparatus, such as device 300 of FIG. 1, while storing received data into an associated memory. Another technical effect may be may be power saving in an apparatus, such as device 200 of FIG. 1, while transmitting data for storing into an associated memory of a write-enabled device, such as device 300 of FIG. 1.

Various operations and/or the like described herein may be executed by and/or with the help of computers. Further, for example, devices described herein may be and/or may incorporate computers. The phrases "computer", "general purpose computer", and the like, as used herein, refer but are not limited to a media device, a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, and/or the like.

Embodiments of the present invention may be implemented in software, hardware, application logic or a combination of software, hardware and application logic. The software, application logic and/or hardware may reside on a memory of any of the apparatuses 200 and 300 of example FIG. 1. In an example embodiment, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that may contain or store the instructions for use by or in connection with an instruction execution system, apparatus, or device, such as a computer.

Figure 8:
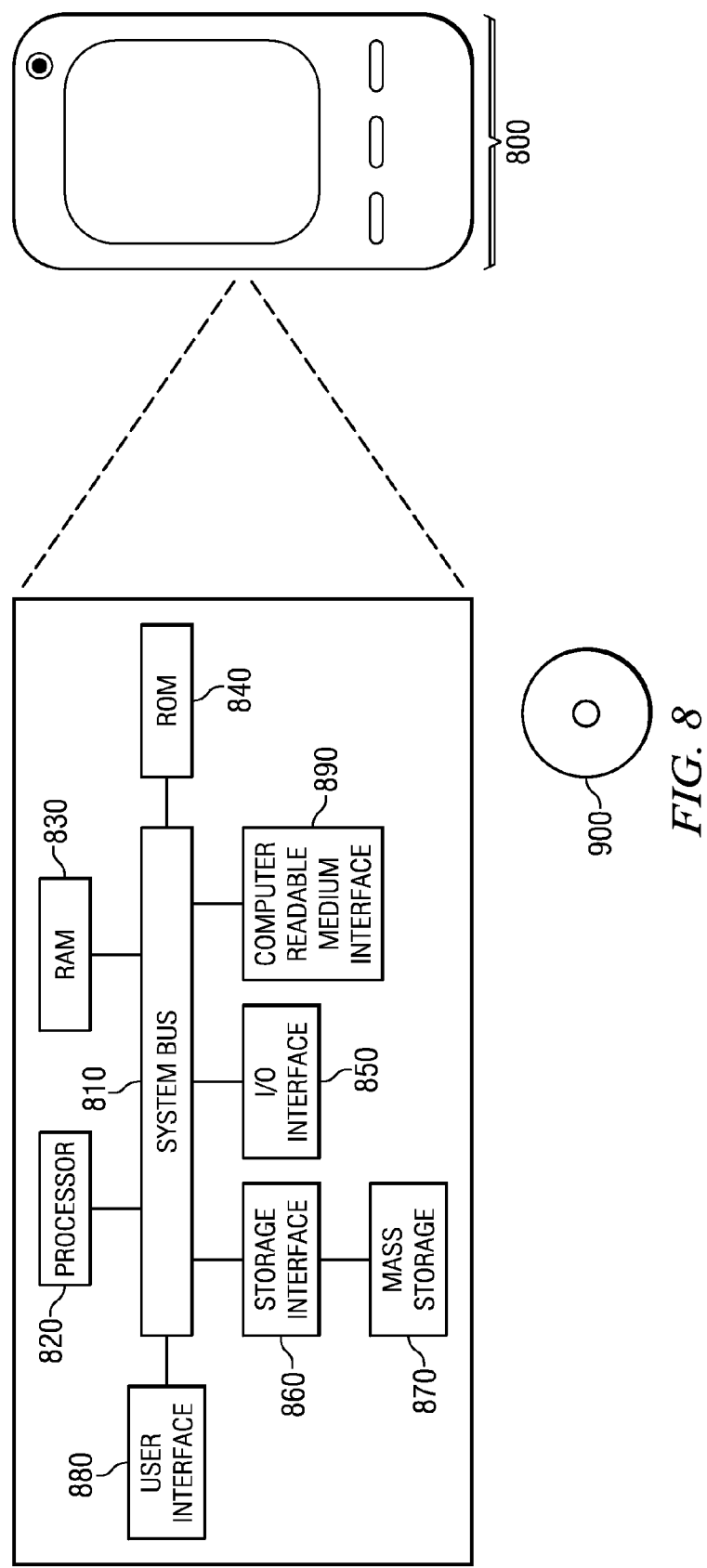
FIG. 8 discloses an apparatus comprising example hardware for implementing computer software instructions stored in the apparatus according to an example embodiment of the present invention.

The phrases "general purpose computer", "computer", and the like may also refer to one or more processors operatively connected to one or more memory or storage units, wherein the memory or storage may contain data, algorithms, and/or program code, and the processor or processors may execute the program code and/or manipulate the program code, data, and/or algorithms. Accordingly, example computer 800 as shown in FIG. 8 that may be considered as one embodiment of the apparatuses 200 and 300 illustrated on FIG. 1 may include various hardware modules for causing the computer to implement one or more embodiments of the present invention. According to one example, the computer 800 include a system bus 810 which may operatively connect processor 820, random access memory 830, read-only memory 840 that may store for example a computer code for the computer 800 in a non-transitory manner to perform the example methods illustrated on FIGS. 4-7. The system bus 810 may further operatively connect input output (I/O) interface 850, storage interface 860, user interface 880 and computer readable medium interface 890. Storage interface 860 may comprise or be connected to mass storage 870.

Mass storage 870 may be a hard drive, optical drive, or the like. Processor 820 may comprise a microcontroller unit (MCU), a digital signal processor (DSP), or any other kind of processor. Computer 800 as shown in this example also comprises a touch screen and keys operating in connection with the user interface 880. In various example embodiments, a mouse, and/or a keypad may alternately or additionally be employed. Computer 800 may additionally include the computer readable medium interface 880, which may be embodied by a card reader, a DVD drive, a floppy disk drive, and/or the like. Thus, media containing program code, for example for performing the example method 500 of FIG. 5, may be inserted for the purpose of loading the code onto the computer.

Computer 800 may run one or more software modules designed to perform one or more of the above-described operations. Corresponding program code may be stored on a non-transitory physical media 900 such as, for example, DVD, CD-ROM, and/or floppy disk. It is noted that any described division of operations among particular software modules is for purposes of illustration, and that alternate divisions of operation may be employed. Accordingly, any operations discussed as being performed by a software module may instead be performed by a plurality of software modules. Similarly, any operations discussed as being performed by a plurality of modules may instead be performed by a single module. It is noted that operations disclosed as being performed by a particular computer may instead be performed by a plurality of computers.

According to one embodiment, a computer program product is provided, the computer program product comprising computer executable program code recorded on a computer readable storage medium, the computer executable program code comprising: A code for causing receipt of, through a transceiver at an apparatus, a first wireless signal comprising payload data and one or more indications instructing write operation for the payload data; and a code for causing powering down of the transceiver at least partly while storing the received payload data into an associated memory within the apparatus according to the one or more indications.

According to one embodiment, a computer program product is provided, the computer program product comprising computer executable program code recorded on a computer readable storage medium, the computer executable program code comprising: A code configured for causing detection of a write-enabled device, a code configured for causing selection of an operation mode configured to write data to the write-enabled device; and a code configured for causing transmission of a first wireless signal comprising payload data and one or more indications configured to instruct write operation for the payload data according to the selected operation mode.

According to one embodiment, a method is provided, the method comprising powering down an associated transceiver at least partly when performing an operation requiring accessing an associated memory.

According to one embodiment, an apparatus is provided, the apparatus comprising a transceiver, at least one processor, and at least one memory including executable instructions, the at least one memory and the executable instructions being configured to, in cooperation with the at least one processor, cause the apparatus to perform at least the following: Power down an associated transceiver at least partly while performing an operation requiring accessing an associated memory According to one embodiment, a computer program product is provided, the computer program product comprising computer executable program code recorded on a computer readable storage medium, the computer executable program code comprising: A code configured for causing powering down an associated transceiver at least partly when performing an operation requiring accessing an associated memory.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
receiving, through a transceiver, a first wireless signal comprising payload data and one or more indications instructing write operation for the payload data; and
powering down the transceiver at least partly for a time period included in the one or more indications while storing the received payload data into an associated memory.

2. A method according to claim 1, further comprising receiving a second wireless signal comprising power for storing the received payload data of the first wireless signal into the associated memory.

3. A method according to claim 2, further comprising maintaining synchrony for communication by extracting timing information from the second wireless signal.

4. A method according to claim 1, wherein storing the received payload data into the associated memory comprises transferring the received payload data temporarily into a buffer memory and storing the payload data into a nonvolatile memory.

5. A computer program product comprising computer executable program code recorded on a non-transitory computer readable storage medium, the computer executable program code comprising:
code configured to receive, through a transceiver, a first wireless signal comprising payload data and one or more indications instructing write operation for the payload data; and
code configured to power down the transceiver at least partly for a time period included in the one or more indications while storing the received payload data into an associated memory.

6. The computer program product according to claim 5, further comprising code configured to receive a second wireless signal comprising power for storing the received payload data of the first wireless signal into the associated memory.

7. The computer program product according to 6, further comprising code configured to maintain synchrony for communication by extracting timing information from the second wireless signal.

8. An apparatus, comprising:
a transceiver;
at least one processor; and
at least one memory including executable instructions, the at least one memory and the executable instructions being configured to, in cooperation with the at least one processor, cause the apparatus to perform at least the following:
receive, through the transceiver, a first wireless signal comprising payload data and one or more indications instructing write operation for the payload data; and
power down the transceiver at least partly for a time period included in the one or more indications while the received payload data is stored into the at least one memory.

9. An apparatus according to claim 8, wherein the at least one memory and the executable instructions are further configured to, in cooperation with the at least one processor, cause the apparatus to receive a second wireless signal comprising power for storing the received payload data of the first wireless signal into the associated memory.

10. An apparatus according to claim 9, wherein the at least one memory and the executable instructions are further configured to, in cooperation with the at least one processor, cause the apparatus to maintain synchrony for communication by extracting timing information from the second wireless signal.

11. An apparatus according to claim 8, wherein the at least one memory and the executable instructions are further configured to, in cooperation with the at least one processor, cause the apparatus to transfer the received payload data temporarily into a buffer memory and store the payload data into a non-volatile memory.

12. A method comprising:
  detecting a write-enabled device;
  selecting an operation mode configured to write data to the write-enabled device; and
  transmitting a first wireless signal comprising payload data and one or more indications configured to instruct the write-enabled device to power down an associated transceiver at least partly for a time period to perform write operation for the payload data according to the selected operation mode.

13. A method according to claim 12, further comprising transmitting a second wireless signal comprising power for powering the write-enabled device at least partly.

14. A method according to claim 13, wherein the second wireless signal further comprises timing information for maintaining synchrony for communication by the write-enabled device.

15. A computer program product comprising computer executable program code recorded on a non-transitory computer readable storage medium, the computer executable program code comprising:
  code configured to detect a write-enabled device;
  code configured to select an operation mode configured to write data to the write-enabled device; and
  code configured to transmit a first wireless signal comprising payload data and one or more indications configured to instruct the write-enabled device to power down an associated transceiver at least partly for a time period to perform write operation for the payload data according to the selected operation mode.

16. The computer program product according to claim 15, further comprising code configured to transmit a second wireless signal comprising power for powering the write-enabled device at least partly.

17. An apparatus, comprising:
  a transceiver;
  at least one processor; and
  at least one memory including executable instructions, the at least one memory and the executable instructions being configured to, in cooperation with the at least one processor, cause the apparatus to perform at least the following:
  detect a write-enabled device;
  select an operation mode configured to write data to the write-enabled device; and transmit a first wireless signal comprising payload data and one or more indications configured to instruct the write-enabled device to power down an associated transceiver at least partly for a time period to perform write operation for the payload data according to the selected operation mode.

18. An apparatus according to claim 17, wherein the at least one memory and the executable instructions are further configured to, in cooperation with the at least one processor, cause the apparatus to transmit a second wireless signal comprising power for powering the write-enabled device at least partly.

19. An apparatus according to claim 18, wherein the second wireless signal further comprises timing information for maintaining synchrony for communication by the write-enabled device.

20. An apparatus according to claim 17, wherein the one or more indications comprise a time period for powering down a transceiver of the write-enabled device at least partly when storing the transmitted payload data.

* * * * *